(12) United States Patent
Giaconi et al.

(10) Patent No.: US 10,467,367 B2
(45) Date of Patent: *Nov. 5, 2019

(54) SYSTEM AND METHOD FOR APPLICATION SPECIFIC INTEGRATED CIRCUIT DESIGN

(71) Applicant: CHRONOS TECH LLC, San Diego, CA (US)

(72) Inventors: Stefano Giaconi, San Diego, CA (US); Giacomo Rinaldi, San Diego, CA (US)

(73) Assignee: CHRONOS TECH LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,068

(22) Filed: Sep. 10, 2018

(65) Prior Publication Data

US 2019/0095553 A1    Mar. 28, 2019

Related U.S. Application Data

(63) Continuation of application No. 15/344,441, filed on Nov. 4, 2016, now Pat. No. 10,073,939.

(60) Provisional application No. 62/251,002, filed on Nov. 4, 2015, provisional application No. 62/372,217, filed on Aug. 8, 2016, provisional application No. 62/250,998, filed on Nov. 4, 2015.

(51) Int. Cl.
*G06F 17/50* (2006.01)

(52) U.S. Cl.
CPC ........ *G06F 17/505* (2013.01); *G06F 17/5036* (2013.01); *G06F 17/5059* (2013.01); *G06F 17/5072* (2013.01); *G06F 17/5077* (2013.01); *G06F 2217/66* (2013.01); *G06F 2217/84* (2013.01)

(58) Field of Classification Search
CPC ...... G06F 13/00; G06F 21/76; G06F 2217/64; G06F 17/5045; G06F 17/505; G06F 17/5054; G06F 17/5059
USPC ........................................................ 716/134
See application file for complete search history.

(56) References Cited

U.S. PATENT DOCUMENTS

| 4,189,625 A | 2/1980 | Strandberg |
| 8,365,113 B1 | 1/2013 | Bhardwaj et al. |
| 9,977,853 B2 | 5/2018 | Giaconi et al. |
| 2002/0105745 A1* | 8/2002 | Kim ................. G11B 20/10009 360/39 |
| 2003/0035496 A1 | 2/2003 | Noda |
| 2004/0151209 A1 | 8/2004 | Cummings |

(Continued)

*Primary Examiner* — Paul Dinh
(74) *Attorney, Agent, or Firm* — Procopio, Cory, Hargreaves & Savitch LLP; Mark W. Catanese

(57) ABSTRACT

Systems and methods for application specific integrated circuit design using Chronos Links are disclosed. A Chronos Link is an ASIC on-chip and off-chip interconnect communication protocol that allows interfaces to transmit and receive information. The protocol may utilize messages or signals to indicate the availability and/or readiness of information to be exchanged between a producer and a consumer allowing the communication to be placed on hold and to be resumed seamlessly. A method includes inserting gaskets and channel repeaters connected to interfaces of multiple intellectual property (IP) blocks in order to replace traditional links with Chronos Links; performing simplified floorplanning; performing simplified placement; performing simplified clock tree synthesis (CTS) and routing; and performing simplified timing closure.

18 Claims, 7 Drawing Sheets

(56) References Cited

U.S. PATENT DOCUMENTS

| | | |
|---|---|---|
| 2005/0180514 A1 | 8/2005 | Choi et al. |
| 2005/0200388 A1 | 9/2005 | Har et al. |
| 2006/0007236 A1* | 1/2006 | Takagi .................. G06F 3/147 |
| | | 345/531 |
| 2008/0285743 A1 | 11/2008 | Yokota et al. |
| 2008/0304430 A1 | 12/2008 | Zhuyan |
| 2009/0106719 A1 | 4/2009 | Stevens |
| 2010/0285743 A1 | 11/2010 | Li et al. |
| 2014/0240326 A1* | 8/2014 | Cutter .................. G06F 13/00 |
| | | 345/502 |
| 2015/0120978 A1* | 4/2015 | Kalyanasundharam ................... |
| | | G06F 12/1009 |
| | | 710/267 |
| 2016/0188522 A1 | 6/2016 | Hilgemberg Pontes et al. |
| 2017/0091130 A1 | 3/2017 | Matsunaga |
| 2017/0308721 A1 | 10/2017 | Pedersen |
| 2018/0109415 A1 | 4/2018 | Han et al. |

\* cited by examiner

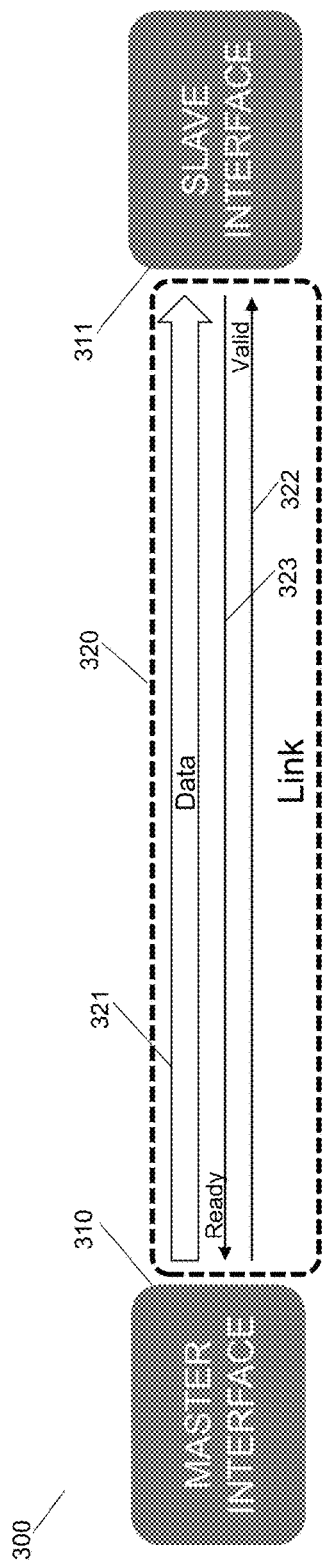
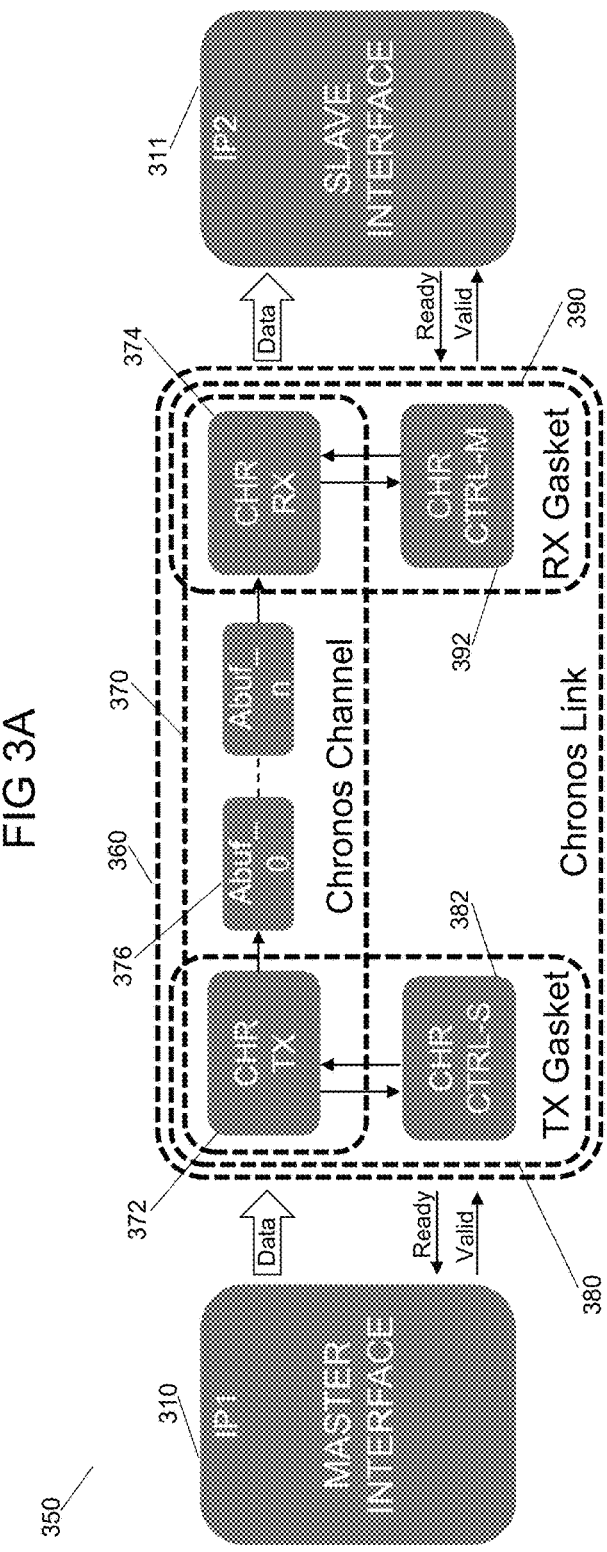
FIG 3A
FIG 3B

SYSTEM AND METHOD FOR APPLICATION SPECIFIC INTEGRATED CIRCUIT DESIGN

RELATED APPLICATION INFORMATION

This present application is a Continuation application of U.S. patent application Ser. No. 15/344,441 filed on Nov. 4, 2016, issued as U.S. Pat. No. 10,073,939, which in turn claims the benefit of priority under 35 U.S.C. 119(e) to Provisional Patent Application Ser. No. 62/251,002, entitled "System and Method for Application Specific Integrated Circuit Design," filed Nov. 4, 2015, and claims the benefit of priority under 35 U.S.C. 119(e) to Provisional Patent Application Ser. No. 62/372,217, entitled "Application Specific Integrated Circuit Point-to-Point Interconnect," filed Aug. 8, 2016 and claims the benefit of priority under 35 U.S.C. 119(e) to Provisional Patent Application Ser. No. 62/250,998, entitled "Application Specific Integrated Circuit Point-to-Point Interconnect," filed Nov. 4, 2015, all of which are incorporated herein by reference as if set forth in full.

BACKGROUND

1. Technical Field

The various embodiments described herein are related to application specific integrated circuits (ASICs), and more particularly to the design of various ASICs.

2. Related Art

Continuing advances in semiconductor device fabrication technology have yielded a steady decline in the size of process nodes. For example, 22 nanometer (nm) process nodes were introduced in 2012 but were quickly succeeded by 14 nm fin field-effect transistors (FinFETs) in 2014 while 5 nm process nodes are projected for 2020.

The decrease in process node size allows a growing number of intellectual property (IP) cores or IP blocks to be placed on a single ASIC chip. That is, modern ASIC designs often spread numerous process nodes across a comparatively large silicon die, and include combinations of IP blocks and logic functions. At the same time, modern technology also requires increased connectivity and large data transfers between various IP blocks. In addition, modern ASIC chips frequently include multiple clock domains in order to leverage multi-core implementations. Thus, one or more clock signals may need to be distributed across the chip in a manner that minimizes clock skew. For instance, the edge of the clock signal received at a logic block located near a clock source should be aligned with those received at more distant logic blocks.

Conventionally, a balanced clock signal distribution (i.e., timing closure) is achieved by inserting buffers. For example, pursuant to a traditional ASIC design flow, after floor planning and placing various IP blocks, a clock tree (i.e., a clock distribution network) may be synthesized and buffers may be added along the signal path from a clock source to various IP blocks according to the clock tree. In fact, timing closure for a clock signal that is distributed over a large and complex ASIC design typically requires the strategic placement of numerous buffers. Moreover, the distribution of a clock signal is also highly susceptible to both systematic and random variations. In particular, proper timing closure must account for the effects of on-chip variations that arise as a result of different process, voltage, and temperature (PVTs) and operation modes, which would otherwise introduce additional clock skews. As such, the most laborious and time consuming aspects of conventional ASIC design tends to be clock alignment and timing closure. Clock tree synthesis and timing closure generally require significant manual intervention. In addition, the mechanisms (i.e., buffers) used to balance the clock across an ASIC chip generally consume a majority of the power in any conventional ASIC design.

Therefore, what is needed are an apparatus and method that overcome these significant problems found in the aforementioned conventional approach to ASIC design.

SUMMARY

Apparatuses and methods for ASIC design are provided. According to various aspects, systems and methods for application specific integrated circuit design using Chronos Links are described. A Chronos Link is an ASIC on-chip and off-chip interconnect communication protocol that allows interfaces to transmit and receive information. The protocol may utilize messages or signals to indicate the availability and/or readiness of information to be exchanged between a producer and a consumer allowing the communication to be placed on hold and to be resumed seamlessly. A method includes inserting gaskets and channel repeaters connected to interfaces of multiple intellectual property (IP) blocks in order to replace traditional links with Chronos Links; performing simplified floorplanning; performing simplified placement; performing simplified clock tree synthesis (CTS) and routing; and performing simplified timing closure.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which:

FIG. 3A is a block diagram illustrating an exemplary point-to-point connection according to various embodiments;

FIG. 3B is a block diagram illustrating an exemplary point-to-point connection implemented with a Chronos Link according to various embodiments;

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Figure 1:
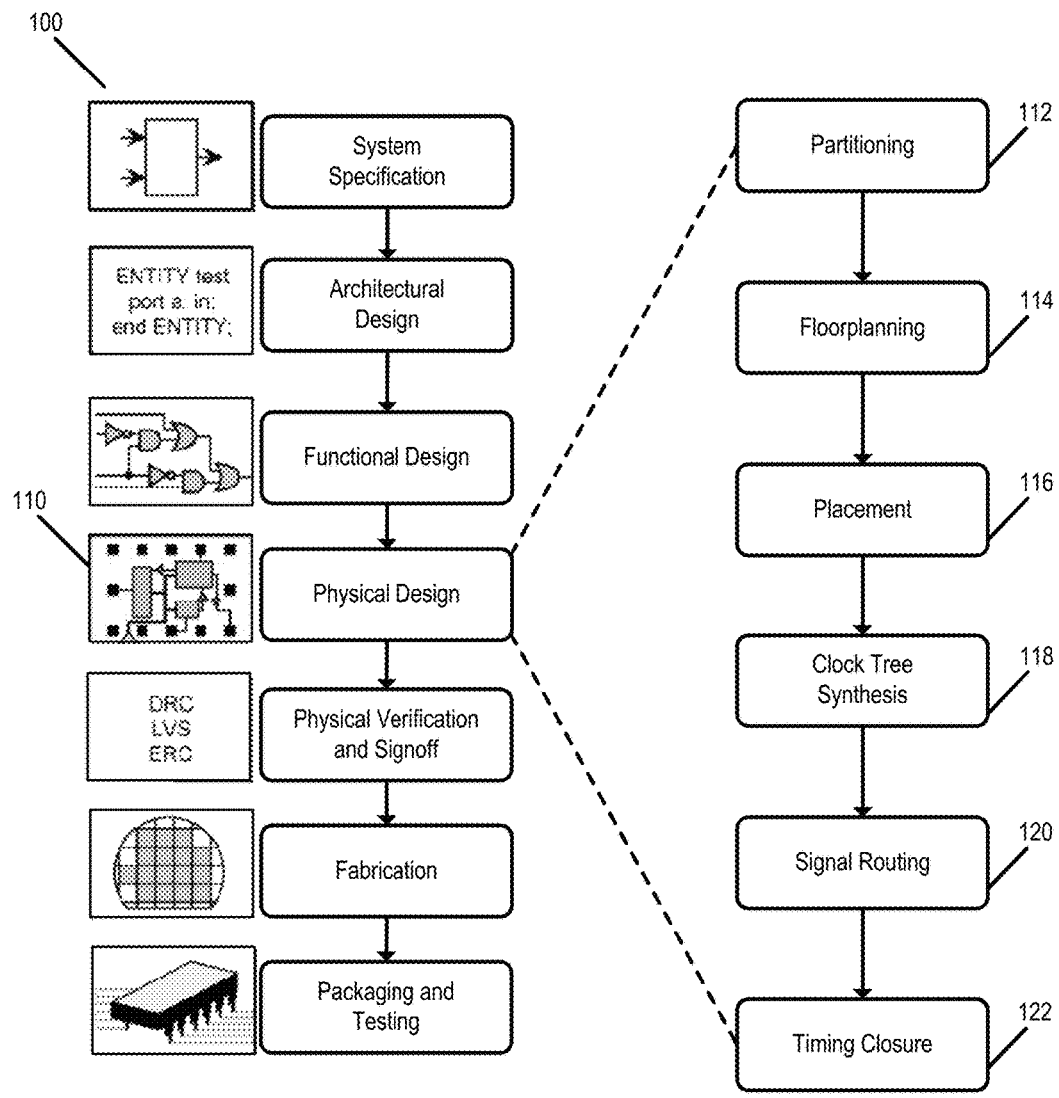
FIG. 1 is a flowchart illustrating a conventional ASIC design flow according to various embodiments.

FIG. 1 is a flowchart illustrating a conventional ASIC design flow (100). The conventional ASIC design flow (100) includes a physical design step (110). The physical design step (110) may include partitioning (112), floorplanning (114), placement (116), clock tree synthesis (118), signal routing (120), and timing closure (122).

Clock tree synthesis (118) may include balancing a clock such as by inserting buffers in various connections in order to minimize clock skew across an ASIC design. Signal routing (120) may include routing a data path from each Intellectual Property (IP) block in the ASIC design, routing one or more clock signals, and routing any remaining signals. Timing closure (122) may include evaluating timing margins across various PVTs and various operating modes.

Figure 2:
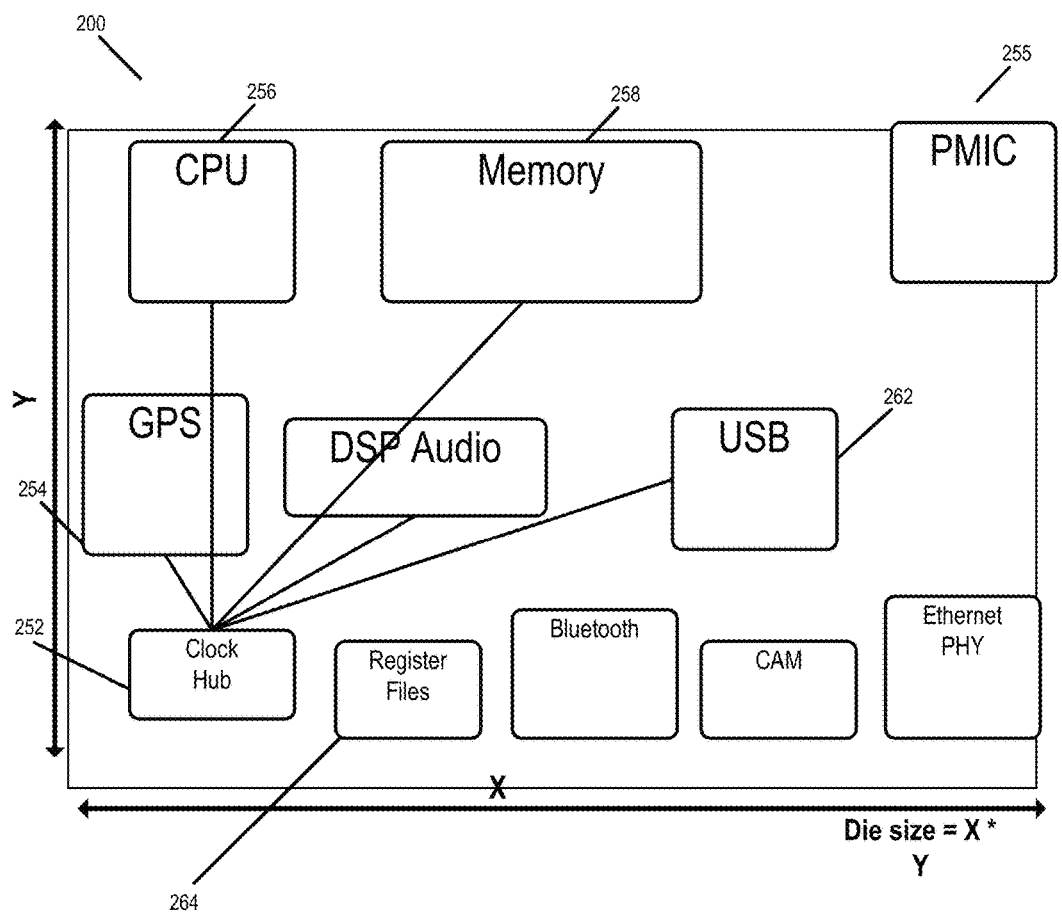
FIG. 2 illustrates an exemplary floorplan of an ASIC design according to various embodiments.

FIG. 2 illustrates a floorplan of an ASIC design (200). The ASIC design (200) may be fabricated on a die (255) (i.e., semiconductor material) having dimensions of "x" and "y" and an area of (x×y). The ASIC design (200) may include a clock hub (252). By applying clock tree synthesis as required in a conventional ASIC design flow (e.g., conventional ASIC design flow 100), a clock signal from the clock hub (252) may be distributed to various IP blocks including, for example, but not limited to, a global positioning system (GPS) block (254), a central processing unit (CPU) (256), a memory block (258), a digital signal processing (DSP) audio block (260), a universal serial bus (USB) (262), and register files (264). Moreover, a multitude of buffers (not shown) may be inserted along the clock path from the clock hub (252) to each of the IP blocks. The ASIC design 200 may also include a Bluetooth module (266), a camera (268) and an Ethernet module (270).

An interface is defined as a set of IP ports that follow a specific protocol in order to exchange data or control information with other interfaces that comply with the same protocol. A link is defined as a set of signals connecting two or more interfaces. Links may be composed of data signals, control signals, and/or a combination of both. Only interfaces that follow the same protocol can be connected together. In one embodiment, FIG. 3A illustrates a block diagram illustrating a point-to-point connection 300. The point-to-point connection 300 includes a link (320) between a Master interface (310) and a Slave interface (311). In the diagram of FIG. 3A, the Master interface (310) transfers data to the Slave interface (311). A flow of data (321) is governed by a protocol implemented with two control signals (322 and 323) including a ready signal sent by the Slave interface 311 to indicate that the Slave interface 311 is ready to receive data from the link, and a valid indicator sent by the Master interface 310 indicating that it has new data to inject into the link. FIG. 3B illustrates a block diagram illustrating a point-to-point connection. The point-to-point connection 350 uses an implementation of a Chronos Link (360) to perform the same data exchange between Master interface (310) and Slave interface (311).

A Chronos Link is an ASIC on-chip and off-chip interconnect communication protocol that allows interfaces to transmit and receive information. The protocol may utilize messages or signals to indicate the availability and/or readiness of information to be exchanged between a producer and a consumer allowing the communication to be placed on hold and to be resumed seamlessly. The Chronos Link (360) is unique by relying on a reduced set of timing assumptions and in its robustness against delay variations, except for those belonging to a few specific forking logic paths called isochronic forks. To do so, the Chronos Link (360) transmits data using delay insensitive (DI) codes and quasi-delay-insensitive (QDI) logic, making the communication insensitive to all wire and gate delay variations. Also, a unique characteristic of a Chronos Link, when compared to related solutions, is the fact that it uses temporal compression in its internal paths to reduce the overheads of QDI logic and efficiently transmit data. In fact, data can be compressed by different ratios, which can be any rational number (as long as a technology specific maximum frequency restriction is respected). The Chronos Link (360) protocol provides an agnostic capability that allows for direct replacement of many commonly used ASIC communication protocol such as AMBA AXI, CoreConnect, IPBus, OCP, Hyper Transport, Quick Path, etc. or can be tailored to a fully custom implementation. The Chronos Link (360) is disclosed in U.S. Pat. No. 9,977,853 (the '853 patent), the disclosure of which is incorporated herein by reference in its entirety as if set forth in full.

In one embodiment the Chronos Link (360) is composed of a Chronos Channel (370) disclosed in U.S. Pat. No. 9,997,852 (the '852 patent), the disclosure of which is incorporated herein by reference in its entirety as if set forth in full, plus a Chronos Slave Controller (382), communicating directly to the original Master interface (310) and a Chronos Master Controller (392) to connect to the original Slave interface (311). The Chronos Link (360), Master Controller (392) and Slave Controller (382) are fully disclosed in the '853 patent. The Chronos Link (360) brings all the advantages of a Chronos Channels to a communication protocol, allowing independent clock references for Master and Slave IPs, PVT tolerance, simplified floorplan, enhanced yield, and data time compression (with potential for reduced routing).

A Chronos Channel is defined by the combination of a DI code (and related handshake protocol), a temporal compression ratio and the hardware required to encode, decode, compress, decompress and transmit data.

DI codes are a specific family of encoding schemes where no codeword can be contained in another codeword. This allows a receiver to perceive the transmission of a codeword unambiguously. Such a characteristic eliminates the need for a control signal that identifies the validity of a data channel, and its respective timing assumptions (as in synchronous or bundled-data asynchronous design), as the validity of the data channel is encoded in the data itself. Also, note that usually DI codes are employed in digital applications, which means that their code words are typically defined using a set of binary values. However, in a Chronos Channel, signals do not need to be digital and codewords can be represented using sets with more than 2 values, provided that data is still encoded using a DI code. In other words, the data in a Chronos Chanel can be composed of analog signals, as long as no codeword is contained in another codeword. Such a characteristic allows a more flexible usage of Chronos Channels. Another aspect of DI codes is that, to allow data transmission, they are usually coupled to a handshake protocol, which is usually 4- or 2-phases.

Referring to FIG. 3B, in various embodiments, a Chronos Channel (370) may include a transmitter (372) (i.e. a synchronous to asynchronous converter) and a receiver (374) (i.e. an asynchronous to synchronous converter). In various embodiments, data signals from the Master interface (310) and a clock signal (not shown) may enter the transmitter (372). The output (i.e., asynchronous data) from the transmitter (372) may travel through a timing independent channel composed of a "n"-number of asynchronous buffer (ABUF) repeaters (376). The asynchronous data from the transmitter (372) is then input into the receiver (374) that is associated with the Slave interface (311). The output of the receiver (374) includes data that is input into the Slave interface (311). Advantageously, the timing independent channel composed of the ABUF repeater (376) is self-regulating and process independent. As such, in various embodiments, the timing independent channel between the transmitter (372) and the receiver (374) may be established by a handshake procedure without any need to perform complex timing closure.

In some embodiments, the timing independent channel between the transmitter (372) and the receiver (374) may include one or more repeaters (376) (e.g., ABUF repeaters). The repeaters (376) may improve signal strength and throughput in the asynchronous channel between the transmitter (372) and the receiver (374). Alternately, the transmitter (372) and the receiver (374) may have a direct connection, i.e., without any ABUF repeaters (376).

A gasket comprises all Chronos Link infrastructure required to transmit or receive information that is directly attached to an interface. In a possible embodiment, a transmitter gasket (380) is composed of a transmitter (372) and a Chronos Slave Controller (382). In various embodiments, a receiver gasket (390) comprises the receiver (374) and a Chronos Master Controller (392).

Figure 4:
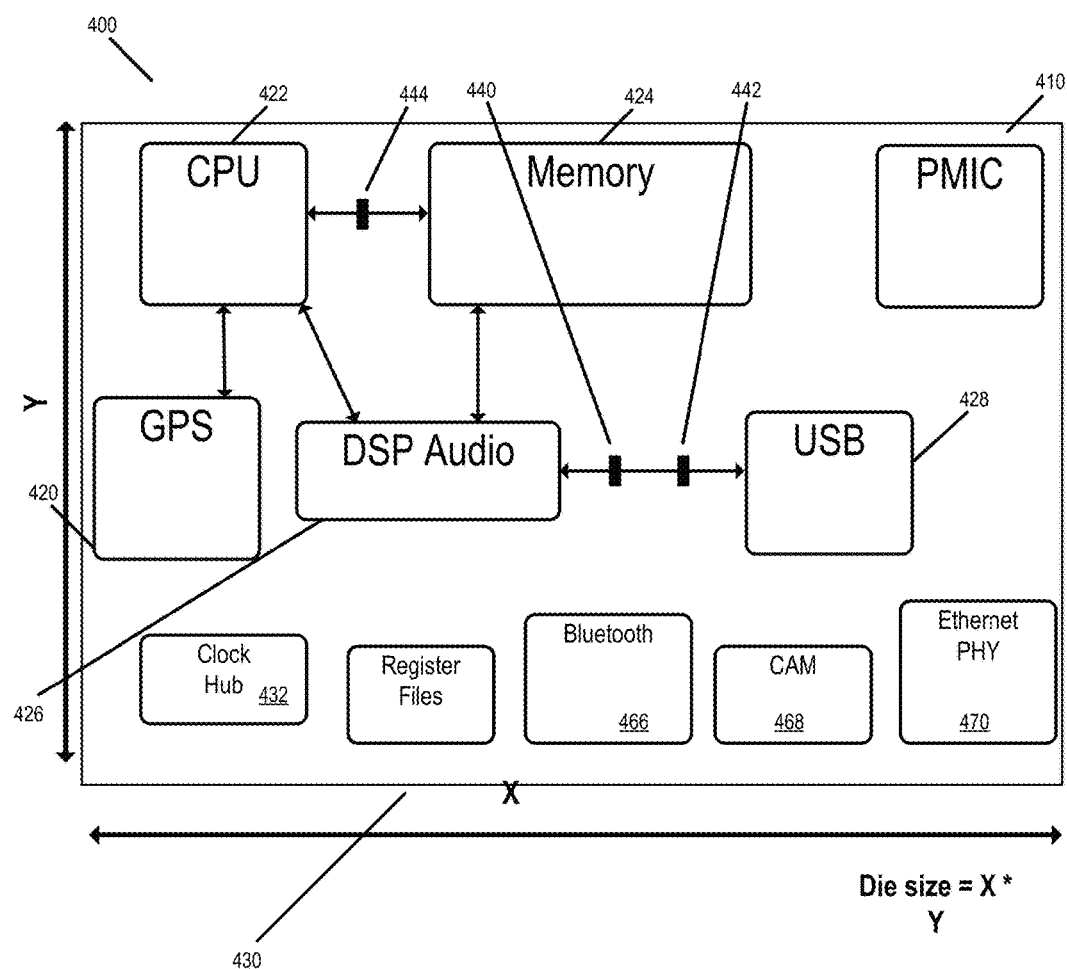
FIG. 4 illustrates an exemplary floorplan of an ASIC design with Chronos Channels according to various embodiments.

FIG. 4 illustrates a floorplan of an ASIC design (400) according to various embodiments. Referring to FIG. 4, in various embodiments, the ASIC design (400) may be fabricated on a die (410) (i.e., semiconductor material) having dimensions of "x" and "y" and an area of (x×y). The ASIC design (400) may include various IP blocks including, for example, but not limited to, a GPS block (420), a CPU (422), a memory block (424), a DSP audio block (426), a USB (428), and register files (430). In various embodiments, the ASIC design (400) includes transmitter and receiver gaskets (shown as border around each IP block). A gasket may not be needed for clock hub (432). For example, data from an IP block is output via a transmitter gasket while data destined for an IP block is input via a receiver gasket. The ASIC design (400) may also include a Bluetooth module 466, a camera 468 and an Ethernet module 470

In various embodiments, gaskets around different IP blocks allow timing independent channels to be established between IP blocks in the ASIC design (400). For example, a first timing independent channel may be established between the GPS block (420) and the CPU (422) using one or more transmitter gaskets and receiver gaskets. In various embodiments, the first timing independent channel may be a part of a point-to-point connection (e.g., the point-to-point connection (200) of FIG. 2) between the GPS block (420) and the CPU (422). A second timing independent channel may be established between the DSP audio block (426) and the CPU (422), the memory block (424), the USB (428), and the register files (430) using one or more transmitter gaskets and receiver gaskets. In various embodiments, the second timing independent channel may be a part of a point-to-multi-point connection between the DSP audio block (426) and the CPU (422), the memory block (424), the USB (428), and the register files (430). In addition, a third timing independent channel may be established between the CPU (422) and the GPS block (420), the DSP audio block (426), and the memory block (424).

According to one exemplary embodiment, timing closure for the ASIC design (400) may be accomplished with simplified top level closure. That is, analyzing and closing timing for each individual IP block in the ASIC design (400) across all corners (i.e., PVT corners) obviates most timing margin evaluation for the ASIC design (400) as a whole. Since synchronous paths may be contained within an IP block in ASIC design (400), chip yields may improve and timing closure margins may be relaxed. In various embodiments, a timing independent channel between two or more IP blocks may include one or more channel repeaters, which can improve signal strength and throughput. In various embodiments, repeaters may be inserted on the basis of distance or other design characteristics between IP blocks. For example, the second timing independent channel between the DSP audio block (426) and the USB (428) may include a first repeater (440) and a second repeater (442). The third timing independent channel between the CPU (422) and the memory block (424) may include a third repeater (444).

Advantageously, the transmitting and receiving gaskets included in the ASIC design (400) renders the top level ASIC design (400) insensitive to PVT variations and resilient to device aging. Due to the reduction of the clock network, the ASIC design (400) also consumes less power. Consequently, the ASIC design (400) may be especially ideal for large area ASICs where routing (i.e., of the clock signal) is difficult and significant effort is traditionally expended in synthesizing a clock tree to balance the skew across die, process corners, and modes of operation. Additionally, as a result of the self-timed nature and encoding of the channel an electromagnetic interference (EMI) profile is altered in a way that helps mask detection of activity patterns. This enhances the security of the device, since these techniques can be used to decipher circuit functionality and other design characteristics.

Figure 5:
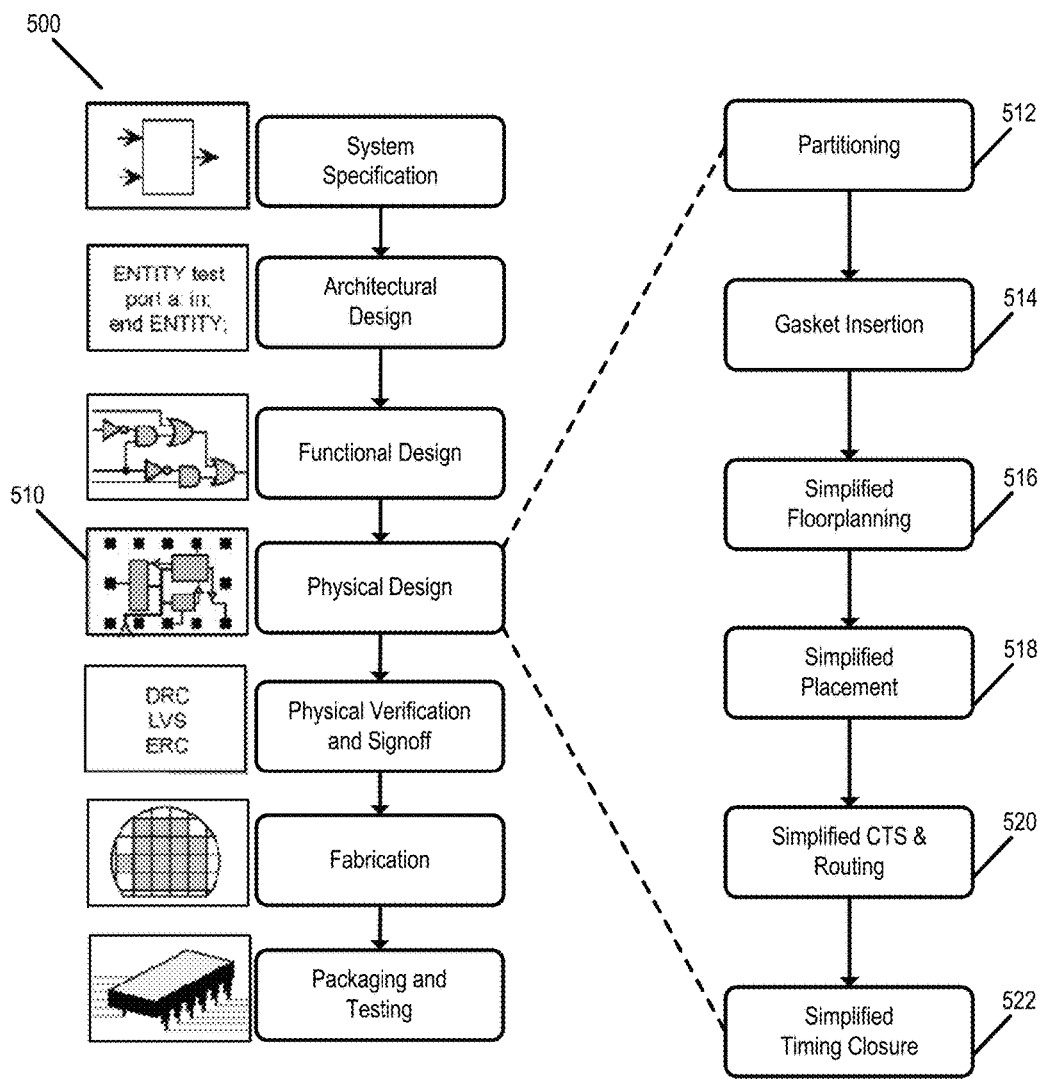
FIG. 5 is a flowchart illustrating an exemplary process for Chronos ASIC design according to various embodiments.

FIG. 5 depicts a flowchart (500) illustrating a Chronos ASIC design flow 500 according to various embodiments, which may be used to implement an ASIC design (400). In various embodiments, the Chronos ASIC design flow (500) includes a physical design step (510). In several embodiments, the physical design step (510) may include partitioning (512), gasket insertion (514), simplified floorplanning (516), simplified placement (518), simplified clock tree synthesis (CTS) and routing (520), and simplified timing closure (522).

In various embodiments, the gasket insertion (514) step is unique to the Chronos ASIC design flow (500) and, thus, is not performed on the standard ASIC design flow (100). In some embodiments, the gasket insertion (514) comprises, among other tasks, insertion of transmitter gaskets (380) and receiver gaskets (390) on each interface of each IP block of the design. The gasket insertion flow is further detailed by a flowchart (600) in FIG. 6.

In various embodiments, simplified floorplanning (516) replaces conventional floorplanning. Due to the simplified CTS and routing, simplified timing closure, and other effects of inserting Chronos Links, the IP blocks in top level may have more flexibility to relocate on die.

In various embodiments, simplified placement (518) replaces conventional placement. Synchronous logic timing paths may be contained to the internal IP core due to gasket insertion at the IP boundary. As a result, the logic previously connected to IP ports now has more flexibility to place within the IP core to simplify timing closure and may result in improved area, power or other design metrics.

In various embodiments, simplified CTS and routing (520) replaces conventional CTS (118) and conventional routing (120). As a result of the Chronos Channel timing independence, IP blocks within the top level may not be subjected to inter-block clock skew balancing requirements.

Additionally, inter-block connections replaced with a Chronos Channel eliminate the synchronous timing closure requirement. This timing closure may have involved inserting clocked flip-flops or latches, including related clock distribution and balancing requirements. In various embodiments, simplified CTS with a Chronos Channel may have reduced clock balancing requirements or reduced number of clock sinks. This may result in lower clock insertion delays or lower power. The Chronos Channel connections may require fewer wires resulting in simplified routing and reduced routing congestion. As a result of the reduced routing, and possibly other effects of adding a Chronos Link, a reduction in chip capacitance may also be achieved.

In various embodiments, simplified timing closure (522) replaces conventional timing closure (122). The use of Chronos Channels obviates a substantial need to evaluate timing margins across PVT corners. The asynchronous protocol may be resilient to most PVT variations and other variations. As a result, synchronous timing closure across corners may be limited to the IP block level. Timing margins may be reduced as a result of the Chronos Channel. A reduction in hold buffering may be achieved, or reduction in setup path requirement may be achieved, with a Chronos Channel. In various embodiments, the simplified timing closure (522) includes timing analysis of a small subset of slow corners and optimization of the Chronos Channel.

In various embodiments, each IP block may be associated with a Liberty file (i.e., .lib) describing the timing and power parameters for the block in a particular technology across a range of operation modes. Moreover, each IP block may also be associated with an abstract view, which may contain the IP physical boundary as well as the location of each pin. A top level netlist may describe the connection between different IP blocks. In addition, information on different clock domains may also be available. The foregoing information may serve as inputs into a gasket generation process.

Figure 6:
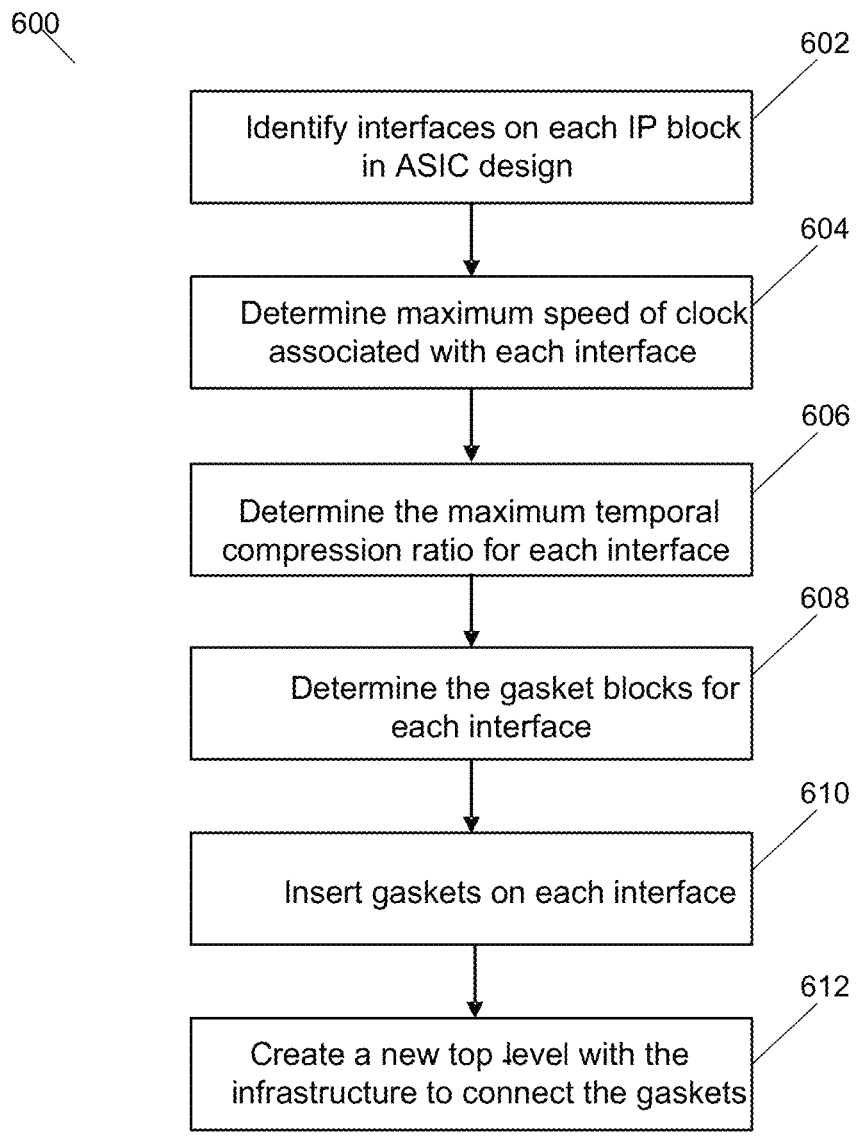
FIG. 6 is a flowchart illustrating an exemplary process for gasket generation according to various embodiments.

FIG. 6 is a flowchart (600) illustrating a process 600 for gasket generation according to various embodiments. Referring to FIG. 6, in some embodiments, the process (600) may implement gasket insertion at the simplified placement step (518). In several embodiments, the process (600) encompasses six steps: identification of interfaces (602) existent on each IP block; assessment of maximum speed of clock associated with each interface (604); computation of temporal compression ratio for each interface (606); determine the gasket blocks for each interface (608); insertion of gaskets associated with each interface (610); and creation of a new top-level with the infrastructure required to connect the previously-inserted gaskets (612).

In some embodiments, the identification of communication interfaces existent on each IP block (602) creates a semantical map between the ports of each IP block and the communication interfaces employed by the IP. In other words, this step groups IP's ports that belong to the same interface, while generating information about the protocol that the interface may need to comply with. The maximum speed of clock associated with each interface is determined next (804).

According to several embodiments, the maximum temporal compression ratio of each interface is determined based on the maximum speed of clock (operating frequency) associated with the interface (606). Chronos Channels do not have a global clock signal, hence their basic performance cannot be defined as an operating frequency, but rather as a cycle time. In such channels, the cycle time is defined as the time between two consecutive transactions when the Channel is always transmitting data. In other words, the cycle time of a Chronos Channel dictates how fast it can consume the data of a producer and how fast it will generate data to a consumer. The minimum cycle time of a Chronos Channel indicates the maximum possible throughput that can be achieved by it. In various embodiments, the maximum temporal compression ratio is computed in order to match the throughput of a Chronos Channel to the throughput of the interface. Next, in various embodiments, the connections between interfaces are traced based on the top-level design, and the gasket blocks are determined (608) in order to ensure that communicating interfaces have compatible temporal compression ratios. At top-level some designs may contain flip-flops or latches or other logic cells to propagate data along the Link, which may be reported, removed, and/or replaced by repeaters. In some embodiments, the last two steps of the gasket generation flow (600) create modified versions of the IP block design source files that include the gaskets (610) and the top-level design source file(s) including the infrastructure to connect them (612).

In various embodiments, the gasket generation flow (600) is implemented by a software called "gasketizer". The gasketizer can include code that defines an RTL parser in order to understand the design hierarchy, links between IP blocks, and the ports of IPs. It can also include a Liberty and constraint file parser to understand the timing requirements of IP block's ports, which can be used to compute the maximum operating frequency. The gasketizer may be able to automatic identify interfaces based on port naming and protocol restrictions, compute the temporal compression ratio for interfaces, and create new RTL implementations containing IP blocks with the associated gaskets along with the top-level with the infrastructure required to connect gaskets. Optionally, the gasketizer may be able to group IP blocks and glue-logic in clusters in order to avoid the insertion of gaskets on certain blocks.

Performance of the Chronos Channel can be calculated by timing analysis of the delays along forward and backward channel data paths. A pseudo clock may be defined in the timing constraints and connected to repeaters along the channel. The cell pins of these repeaters may have timing check tables defined in their libraries, where the internal cell delays may be split between the input setup and clock-to-output definitions. The cell pins may or may not have the actual arc described in the table. The pseudo clock may not be an active design clock, but can be a mechanism to enable static timing analysis (STA) of the channel for delay analysis, optimization, and cycle time calculation. Alternatively, or in combination with the pseudo clock, a maximum delay constraint, or other constraint, may be applied to the forward and backward paths for analysis and optimization.

Channel repeaters are used to propagate data along the channel between gaskets, and can be represented as a single cell or composed as a group of cells. These repeaters may be inserted based on wirelength, capacitance, resistance, delay based timing analysis, or other design characteristics. There may be restrictions on the minimum number of repeaters, or total number of repeaters, that may exist on a channel. After insertion the repeater count may be updated into the original design source code for functional equivalence and performance analysis. The model of channel cells may be as multi-bit flip-flop or as multi-bit buffer, or another functional description. The multi-bit flip-flop model can be used along with the pseudo-clock for channel timing analysis and optimization. The multi-bit buffer model can allow view as pass thru circuit, for functional equivalence analysis without modification of the logic design parameters, and also to ease automation of insertion and removal of repeaters with electronic design automation (EDA) tools. Power analysis of the gasket and channel circuits may use custom activity definitions, depending on the compression ratios used within them.

Figure 7:
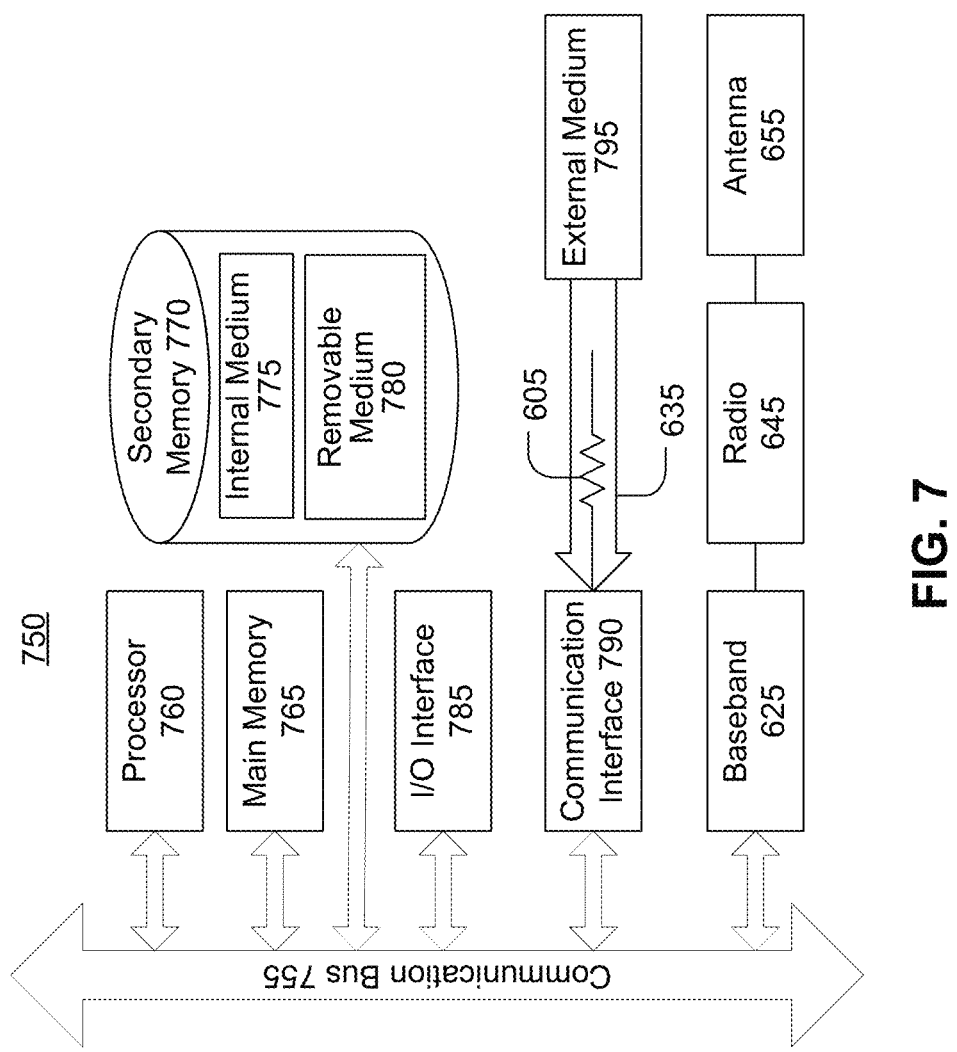
FIG. 7 is a block diagram illustrating an exemplary wired or wireless system according to various embodiments.

FIG. 7 is a block diagram illustrating a wired or wireless system 750 according to various embodiments that may utilize the systems and methods described above in reference to the other Figures. For example, the the system 750 could be utilized to perform the process 600 of FIG. 6. In various embodiments, the system 750 may be a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 750 preferably includes one or more processors, such as processor 760. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 760.

The processor 760 is preferably connected to a communication bus 755. The communication bus 755 may include a data channel for facilitating information transfer between storage and other peripheral components of the system 750. The communication bus 755 further may provide a set of signals used for communication with the processor 760, including a data bus, address bus, and control bus (not shown). The communication bus 755 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The system 750 preferably includes a main memory 765 and may also include a secondary memory 770. The main memory 765 provides storage of instructions and data for programs executing on the processor 760. The main memory 765 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 770 may optionally include an internal memory 775 and/or a removable medium 780, for example a floppy disk drive, a magnetic tape drive, a compact disc ("CD") drive, a digital versatile disc ("DVD") drive, etc. The removable medium 780 is read from and/or written to in a well-known manner. Removable medium 780 may be, for example, a floppy disk, magnetic tape, CD, DVD, SD card, etc.

The removable medium 780 is a non-transitory computer readable medium having stored thereon computer executable code (i.e., software) and/or data. The computer software or data stored on the removable medium 780 is read into the system 750 for execution by the processor 760.

In alternative embodiments, secondary memory 770 may include other similar means for allowing computer programs or other data or instructions to be loaded into the system 750. Such means may include, for example, an external medium 795 and a communication interface 790. Examples of external medium 795 may include an external hard disk drive or an external optical drive, or and external magneto-optical drive.

Other examples of secondary memory 770 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are a removable medium 580 and a communication interface 790, which allow software and data to be transferred from an external medium 795 to the system 750.

The system 750 may also include an input/output ("I/O") interface 785. The I/O interface 785 facilitates input from and output to external devices. For example the I/O interface 785 may receive input from a keyboard or mouse and may provide output to a display. The I/O interface 785 is capable of facilitating input from and output to various alternative types of human interface and machine interface devices alike.

The communication interface 790 allows software and data to be transferred between system 750 and external devices (e.g. printers), networks, or information sources. For example, computer software or executable code may be transferred to system 750 from a network server via communication interface 790. Examples of communication interface 790 include, for example, but not limited to, a modem, a network interface card ("NIC"), a wireless data card, a communications port, a PCMCIA slot and card, an infrared interface, and an IEEE 1394 fire-wire.

The communication interface 790 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 790 are generally in the form of electrical communication signals 605. In one exemplary embodiment, these electrical communication signals 605 are provided to the communication interface 790 via a communication channel 635. In one embodiment, the communication channel 635 may be a wired or wireless network, or any variety of other communication links. The communication channel 635 carries the electrical communication signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 765 and/or the secondary memory 770. Computer programs can also be received via communication interface 590 and stored in the main memory 765 and/or the secondary memory 770. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 750. Examples of these media include the main memory 765, the secondary memory 770 (including the internal memory 775, the removable medium 780, and the external medium 795), and any peripheral device communicatively coupled with the communication interface 790 (including a network information server or other network device). These non-transitory computer readable mediums are means for providing executable code, programming instructions, and software to the system 750.

In one embodiment implemented using software, the software may be stored on a computer readable medium and loaded into the system 750 by way of the removable medium 780, the I/O interface 785, or the communication interface 790. In such an embodiment, the software is loaded into the system 750 in the form of electrical communication signals 605. The software, when executed by the processor 760, preferably causes the processor 760 to perform the inventive features and functions previously described herein.

The system 750 also includes optional wireless communication components that facilitate wireless communication over a voice and over a data network. The wireless communication components comprise an antenna system 655, a radio system 645 and a baseband system 625. In the system 750, radio frequency ("RF") signals are transmitted and received over the air by the antenna system 655 under the management of the radio system 645.

In one embodiment, the antenna system 655 may comprise one or more antennae and one or more multiplexors (not shown) that perform a switching function to provide the antenna system 655 with transmit and receive signal paths. In the receive path, received RF signals can be coupled from a multiplexor to a low noise amplifier (not shown) that amplifies the received RF signal and sends the amplified signal to the radio system 645.

In alternative embodiments, the radio system 645 may comprise one or more radios that are configured to communicate over various frequencies. In one embodiment, the radio system 645 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 645 to the baseband system 625.

If the received signal contains audio information, then baseband system 625 decodes the signal and converts it to an analog signal. Then the signal is amplified and sent to a speaker. The baseband system 625 may also receive analog audio signals from a microphone. These analog audio signals are converted to digital signals and encoded by the baseband system 625. The baseband system 625 also codes the digital signals for transmission and generates a baseband transmit audio signal that is routed to the modulator portion of the radio system 645. The modulator mixes the baseband transmit audio signal with an RF carrier signal generating an RF transmit signal that is routed to the antenna system 655 and may pass through a power amplifier (not shown). The power amplifier amplifies the RF transmit signal and routes it to the antenna system 655 where the signal is switched to the antenna port for transmission.

The baseband system 625 may also be communicatively coupled with the processor 760. The processor 760 has access to main memory 765 and/or secondary memory 770. The processor 760 is preferably configured to execute instructions (i.e., computer programs or software) that can be stored in the main memory 765 or the secondary memory 770. Computer programs can also be received from the baseband system 625 and stored in the main memory 765 or in secondary memory 770, or executed upon receipt. Such computer programs, when executed, enable the system 750 to perform the various functions of the present invention as previously described. For example, the main memory 765 may include various software modules (not shown) that are executable by processor 760. The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An application specific integrated circuit (ASIC) chip comprising:
   multiple components;
   multiple interfaces corresponding to the multiple components and each configured to utilize a respective communication protocol; and
   at least one gasket between two or more interfaces of the multiple interfaces, the at least one gasket configured to provide control of timing requirements of a communications link connecting the two or more interfaces that utilizes a communication protocol, the at least one gasket is based on the respective communication protocols utilized by the two or more interfaces and timing estimates between the components of the multiple components corresponding to two or more interfaces,
   wherein, to utilize the communication protocol of the communications link, the at least one gasket is further configured to:
      encode information to be communicated between the components of the multiple components corresponding to the two or more interfaces over the communications link using delay-insensitive (DI) codes,
      temporally compress the information to be communicated between the components of the multiple components corresponding to the two or more interfaces,
      communicate the encoded information between the components of the multiple components corresponding to the two or more interfaces over the communications link using quasi-delay insensitive logic, and
      exchange signals over the communications link to indicate availability and readiness of information to be communicated between the components of the multiple components corresponding to the two or more interfaces.

2. The chip of claim 1, wherein the at least one gasket is based in part on:
   a maximum operating frequency of each of the two or more interfaces; and
   a maximum temporal compression ratio to use for each of the two or more interfaces.

3. The chip of claim 2, wherein the maximum temporal compression ratio is based on the maximum operating frequency of each of the two or more interfaces.

4. The chip of claim 1, further comprising a repeater inserted between the components corresponding to the two or more interfaces based on the determined timing estimates.

5. The chip of claim 4, wherein the insertion of the repeater is based on at least one of a distance between the components corresponding to the two or more interfaces, wire length, capacitance, and resistance.

6. The chip of claim 1, wherein the at least one gasket is based on at least one of a physical boundary of a component, information on clock domains of a pair of components, location of pins of a component and a type of connection between a pair of components.

7. The chip of claim 1, wherein the at least one gasket comprises a plurality of gaskets, and the ASIC chip further comprises a top-level infrastructure connecting the plurality of gaskets configured for the components corresponding to the two or more interfaces.

8. The chip of claim 1, wherein the at least one gasket comprises a controller and one or more of a transmitter, a receiver, and transceiver, the controller configured to establish the communications link connecting the two or more interfaces.

9. The chip of claim 1, wherein the respective communication protocols of the two or more interfaces are different than the communication protocol utilized by the communication link.

10. The chip of claim 1, wherein the respective communication protocols of the two or more interfaces are the same communication protocol.

11. The chip of claim 1, wherein the timing-independent communication link is not coupled to a global clock signal.

12. An application specific integrated circuit (ASIC) chip comprising:
   a first intellectual property (IP) block and a second IP block;
   a first interface and a second interface configured to utilize a respective communication protocol;

a communications link connecting the first and second interfaces based on a communication protocol; and at least one gasket between the first and second interfaces and configured to provide control of timing requirements of the communications link, the at least one gasket is based on the respective communication protocols utilized by the first and second interfaces and timing estimates between the first and second IP blocks, wherein, to utilize the communication protocol of the communications link, the at least one gasket is further configured to:

encode information to be communicated between the first and second IP blocks over the communications link using delay-insensitive (DI) codes, temporally compress the information to be communicated between the first and second IP blocks, communicate the encoded information between the first and second IP blocks using over the communications link using quasi-delay-insensitive-logic, and exchange signals over the communications link to indicate availability and readiness of information to be communicated between the first and second IP blocks.

13. The chip of claim 12, wherein the at least one gasket is based in part on:

a maximum operating frequency of each of the first and second interfaces; and a maximum temporal compression ratio to use for each of the first and second interfaces.

14. The chip of claim 13, wherein the maximum temporal compression ratio is based on the maximum operating frequency of each of the first and second interfaces.

15. The chip of claim 12, further comprising a repeater inserted between the first and second IP blocks based on the determined timing estimates.

16. The chip of claim 15, wherein the insertion of the repeater is based on at least one of a distance between the first and second IP, wire length, capacitance, and resistance.

17. The chip of claim 12, wherein the at least one gasket is based on at least one of a physical boundary of one of the first and second IP blocks, information on clock domains of the first and second IP blocks, location of pins of the first and second IP blocks and a type of connection between the first and second IP blocks.

18. The chip of claim 12, wherein the at least one gasket comprises a first gasket and a second gasket, and the ASIC chip further comprises a top-level infrastructure connecting the first and second gaskets.

* * * * *